United States Patent
Paige, Sr.

(10) Patent No.: US 12,258,249 B1
(45) Date of Patent: Mar. 25, 2025

(54) RAMP FOR ELEVATING A TIRE FOR INSTALLING CHAINS

(71) Applicant: Randall Lee Paige, Sr., Bennett, CO (US)

(72) Inventor: Randall Lee Paige, Sr., Bennett, CO (US)

( * ) Notice: Subject to any disclaimer, the term of this patent is extended or adjusted under 35 U.S.C. 154(b) by 0 days.

(21) Appl. No.: 18/642,569

(22) Filed: Jul. 8, 2024

(51) Int. Cl.
  *B66F 7/24* (2006.01)
  *B60C 27/00* (2006.01)

(52) U.S. Cl.
  CPC ............ *B66F 7/243* (2013.01); *B60C 27/003* (2013.01)

(58) Field of Classification Search
  CPC ................................ B66F 7/243; B60C 27/003
  See application file for complete search history.

(56) References Cited

U.S. PATENT DOCUMENTS

| | | | | |
|---|---|---|---|---|
| 3,178,156 | A * | 4/1965 | Rigers | B66F 7/243 254/88 |
| 4,327,896 | A * | 5/1982 | Whitehead | B66F 7/243 254/88 |
| 4,993,685 | A * | 2/1991 | Sparling | B66F 7/243 254/88 |
| 5,118,081 | A * | 6/1992 | Edelman | B66F 7/243 254/88 |
| 5,544,861 | A * | 8/1996 | Wisner | B66F 7/243 72/705 |
| 6,945,514 | B1 * | 9/2005 | Conwell | B66F 7/243 254/88 |
| 7,104,524 | B1 * | 9/2006 | Hidding | B66F 7/243 254/88 |
| 8,782,839 | B1 * | 7/2014 | Forbis | B66F 7/243 254/88 |
| 9,751,736 | B1 * | 9/2017 | Fortin | B66F 3/25 |
| 9,868,622 | B1 * | 1/2018 | Turner | B60T 3/00 |
| 11,090,988 | B2 * | 8/2021 | Huffman | B60C 27/003 |

FOREIGN PATENT DOCUMENTS

CN        104727216 A    *  6/2015

* cited by examiner

*Primary Examiner* — Bayan Salone
(74) *Attorney, Agent, or Firm* — Scott D. Swanson; Shaver & Swanson, LLP (57) ABSTRACT

An improved ramp for facilitating the application of snow chains to the outer tire of a dual tire configuration of a semi truck, or other dual wheeled vehicle. The ramp has a front apron that is close to and parallel to the ground. The front apron allows for the tire to drive on to the apron without pushing the ramp out from under the tire. The tire then travels up an incline section to a top, supporting surface. The bottom of the ramp has a series of adjustable friction enhancing projections that increase friction between the bottom of the ramp and the ground. The friction enhancing projections are adjustable in length, allowing for a user to make the projections longer beneath the supporting surface, further facilitating driving the tire onto the ramp.

14 Claims, 11 Drawing Sheets

RAMP FOR ELEVATING A TIRE FOR INSTALLING CHAINS

FIELD OF THE INVENTION

The presently disclosed technology relates to a ramp and suspension platform for suspending a vehicle tire. More particularly, the present invention is a ramp having an apron and designed to support the inner wheel of a dual tired vehicle, with a particular beneficial use of the installation of snow chains.

BACKGROUND OF THE INVENTION

When semi truck drivers are transporting materials across the country or across parts of the country, inclement weather such as snow storms and icy road conditions are often encountered in the fall, winter and spring months. These conditions often require the driver to install tire chains on the tires. Preferably, with dually tires, a tire chain is placed on each of the outer tires. However, this process can be laborious such as the truck driver having to position the chain set on an extended position on the ground. The driver then has to drive the semi truck such that the tire is rolled into a position on the chain so that the driver can then install the chain around the tire. Several attempts have been made to improve this access by elevating the outer wheel. However, this difficulty in driving the semi onto these devices without the devices sliding out. This same problem occurs when standard ramps such as those used in oil changes are used. Accordingly, what is needed is an improved device for placement of the semi truck tires in an elevated position, with features for preventing the device from being pushed out by the tire.

SUMMARY

The purpose of the Summary is to enable the public, and especially the scientists, engineers, and practitioners in the art who are not familiar with patent or legal terms or phraseology, to determine quickly from a cursory inspection, the nature and essence of the technical disclosure of the application. The Summary is neither intended to define the inventive concept(s) of the application, which is measured by the claims, nor is it intended to be limiting as to the scope of the inventive concept(s) in any way.

What is disclosed is an improved commercial ramp for use in elevating a tire and wheel combination. The ramp has an elongate top platform configured for support thereon of a tire of a vehicle. The elongate top platform forms the top surface of the body of the ramp. The elongate top platform having a horizontal surface relative to the ground and positioned on top of said body so as to support a tire above the ground.

A planar front apron extends from the body in a parallel orientation to the elongate top platform. An inclined front edge extends from the front of the elongate top platform to the apron. The inclined front edge forms a front edge of the body of the ramp. The inclined edge is configured to provide an inclined surface for the tire to roll from the apron up the inclined edge to the elongate top platform. The front edge of the planar front apron can be beveled to facilitate driving of the tire onto the apron, while reducing the potential for the apron to be pushed from under the tire.

The apron, the inclined edge, and the elongate top platform preferably each has a friction enhancing textured surface. In the depicted embodiment a metal grating is applied to the surface. Alternate friction enhancing textures can be used in addition to or alternate to the metal grating. For example, if the ramp is a molded plastic the friction enhancing texture can be provided as ridges, projections, bumps, or other friction enhancing textures.

A plurality of adjustable friction enhancing projections extends from the bottom side of said ramp. The adjustable friction enhancing projections extend away from said lower surface or bottom of the ramp. The adjustable friction enhancing projections are configured for adjustability in length. Each of said adjustable friction enhancing projections extends away from said bottom side of the ramp. Preferably the adjustable friction enhancing projections are threaded bolts that are threadingly engaged with female threaded openings positioned in the bottom of the ramp. The bolts can have hex heads, or other versions of heads. Alternatively the bolts can be headless shanks. Preferably these friction enhancing projections extend along the length of the bottom of the ramp, and the adjustability allows a user to alter the height of the ramp from apron to back, further facilitating the retention of the ramp as a tire drives onto the ramp.

The ramp is configured for the tire to drive onto the apron, with the weight of the vehicle distributed to the tire applied to the apron. This weight and increased friction between the ramp and the road surface below the ramp prevents the ramp from being pushed by the tire away from the tire as the tire drives up the inclined front edge to the elongate top platform.

The improved commercial ramp of claim 1 wherein a front edge of said apron is beveled to facilitate a tire rolling onto said apron.

The improved commercial ramp of claim 1 wherein said inclined edge is at a fifty to seventy degree incline from a top surface of said apron.

A method of using the above described ramp to install a snow chain assembly onto the outer tire of a dual tire assembly is provided. The first step is to provide an improved commercial ramp as described above. The step of driving an inner tire of the dual tire configuration onto the apron, and up the inclined edge to the elongate to platform to freely suspend the outer tire of the dual tire configuration.

The next step is for the vehicle to be driven or rolled such that the inner tire of the dual tire configuration travels onto the apron, up the inclined front edge, and onto the elongate platform. This serves to elevate the outer tire of the dual tire configuration. A user then applies the snow chain, then performs the step of driving the inner tire back down off of the improved commercial ramp.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature.

DETAILED DESCRIPTION OF THE INVENTION

While the presently disclosed inventive concept(s) is susceptible of various modifications and alternative constructions, certain illustrated embodiments thereof have been shown in the drawings and will be described here in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

Figure 1:
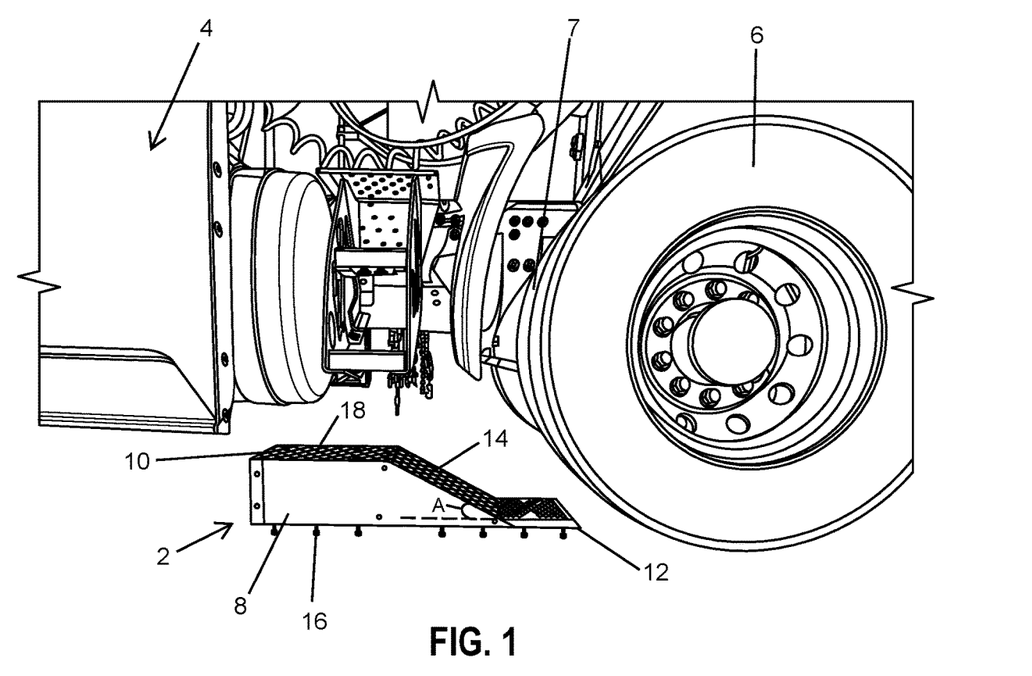
FIG. 1 is a partial perspective view of a semi truck with the improved ramp positioned in front of the tires such that the inner tire can be driven on to the ramp to elevate the outer tire.

FIG. 1 illustrates a partial view of a semi truck 4 with the improved ramp 2 positioned beneath the semi truck and in front of the dual tires. The improved ramp has a body 8 that is configured for supporting the weight of the inner tire of the semi truck such that the outer tire is elevated. The semi truck has inner tire 7 and outer tire 6. The ramp has a body 8 that has a top surface 10 that is configured for support of the tire in a static position. The body extends to a ramp section 14 that leads to an apron 12. The apron provides an elongate planer surface onto which the inner tire is initially driven. The weight of the inner tire on the apron prevents the device from being pushed away from the rolling tire. The device has a series of friction enhancing projections 16 on a bottom surface of the device. The friction enhancing projections further enhance the retention of the device beneath the tire. These friction enhancing projections are constructed to be adjustable in length, and preferably removable.

The friction enhancing projections preferably are adjustable in length. In the depicted embodiment, the friction enhancing projections are hex head bolts that are threadingly engaged with female threaded openings positioned on an underside of the device, as show in further detail in FIG. 10.

Figure 2:
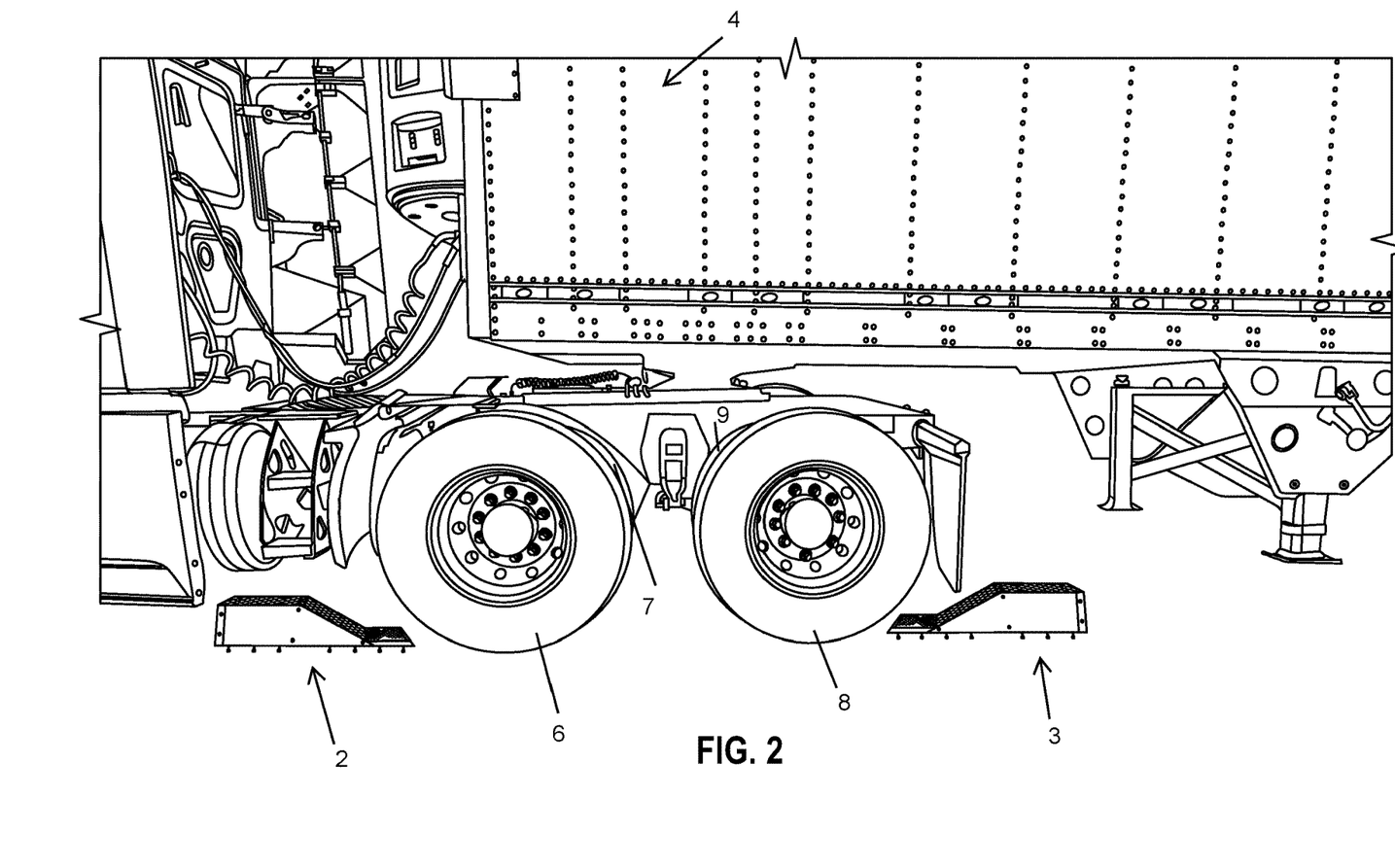
FIG. 2 illustrates a partial perspective view of a semi truck with two improved ramps positioned in front of and behind the tires for driving the inner tire of each dual tire configuration onto each respective ramp in turn.

FIG. 2 illustrates two of the devices 2, 3 positioned on opposing sides of two dual sets of wheels 6,7,8,9. The ramps are each positioned such that the inner tire of each dual set of wheels will roll on to the adjacent ramp. Forward ramp 2 is oriented such that inner tire 7 will roll onto the front ramp 2. The second ramp 3 is positioned such that the inner tire 9 will roll onto the ramp if the semi truck rolls in the reverse direction. Placement of the inner tire on either ramps suspends the outer tire of the dual tire assembly, allowing the driver or other person to install the tire chain assembly on to the outer tire.

Figure 3:
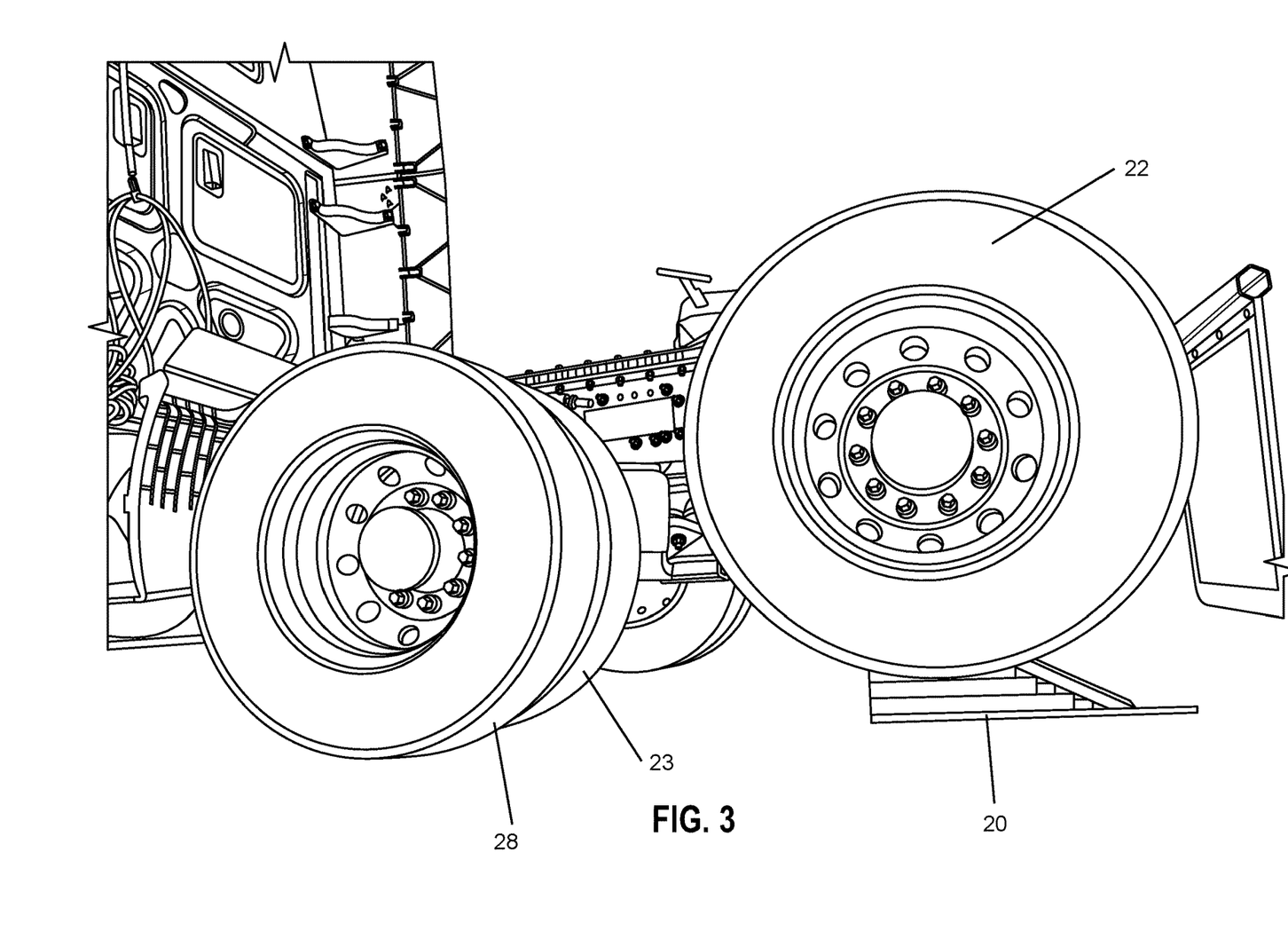
FIG. 3 illustrates a partial perspective view of the inner tire of the rear axle of a semi truck driven onto an improved ramp to support the inner tire while a tire chain is applied to the outer tire.

FIG. 3 illustrates an outer tire 22 suspended by the positioning of the ramp 20 beneath an inner tire (the inner tire is obscured by outer tire). The relationship of the outer tire to the inner tire is shown in further detail in the forward dual tire assembly represented by inner tire 23 and outer tire 28.

Figure 4:
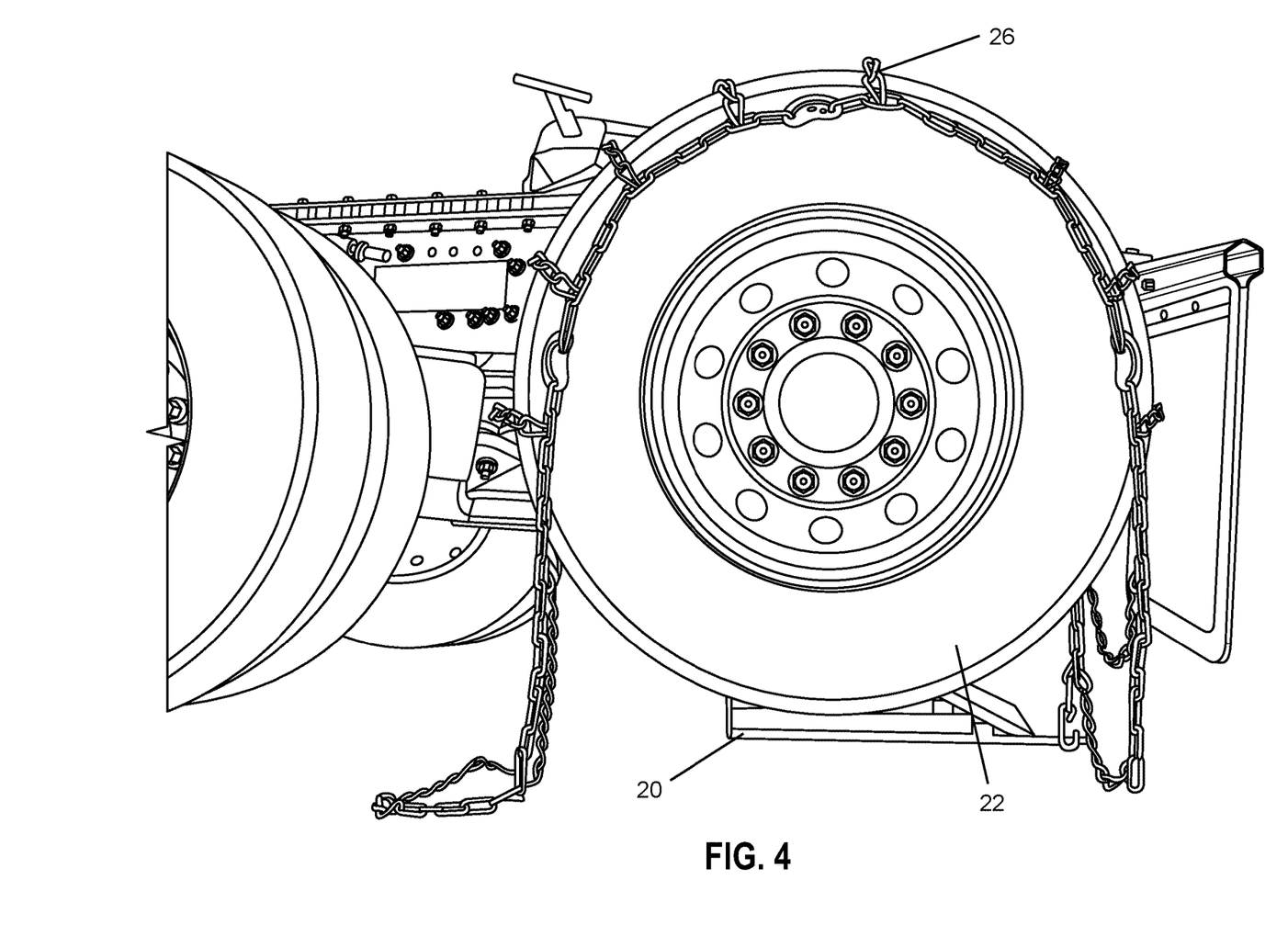
FIG. 4 illustrates a partial perspective view of a tire chain being placed on the outer tire of the semi truck depicted in FIG. 3.
Figure 5:
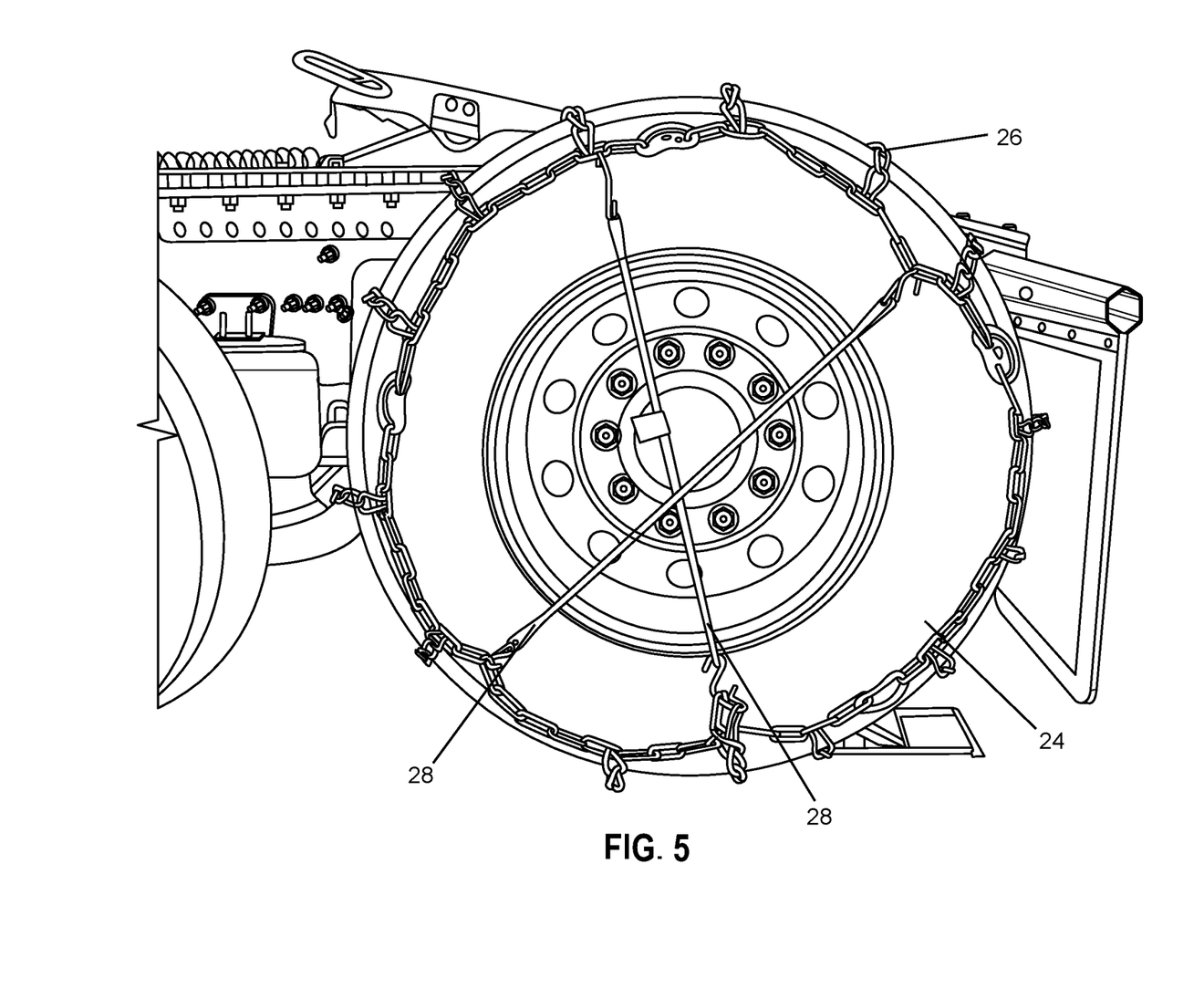
FIG. 5 illustrates a partial perspective view of a tire chain and bungee cords placed on the outer tire of the semi truck depicted in FIGS. 3-4.

FIG. 4 illustrates the outer tire 22 suspended such that its chain assembly 26 is being positioned on to the outer tire. The inner tire is positioned onto the body of the ramp apparatus 20. FIG. 5 shows the full chain assembly assembled onto the outer tire 24. The chain assembly is connected with tensioning bungee cords 28, as is standard in applying vehicle chains to passenger or semi truck tires.

FIG. 5 shows the full chain assembly assembled onto the outer tire 24. The chain assembly is connected with tensioning bungee cords 28, as is standard in applying vehicle chains to passenger or semi truck tires.

Figure 6:
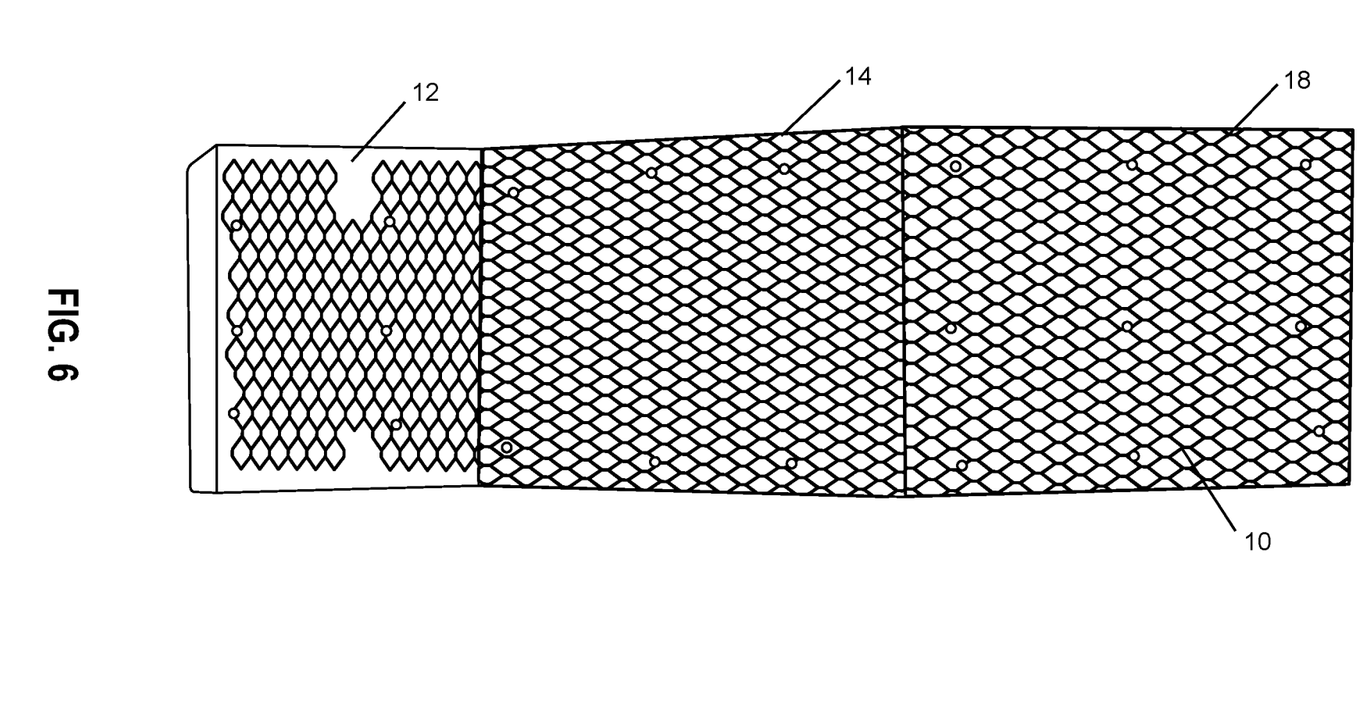
FIG. 6 is a top view of the preferred embodiment of the improved ramp illustrating a friction enhancing metal grate placed on the top surfaces of the ramp.

FIG. 6 illustrates a top view of the preferred embodiment of the improved ramp apparatus. The front apron 12 extends forward and provides an elongate flat planer surface upon which a tire of the vehicle is to be driven. In a preferred embodiment this lower apron is approximately seven inches long. The thickness of this apron is configured such that the top surface of the apron is close to the ground, presenting a small step up toward the incline or sloped section of the device.

The apron extends to a sloped ramp having a slope of approximately sixty degrees from horizontal as shown as reference number A in FIG. 1. The overall length of the ramp is approximately thirty inches with the width being ten inches to facilitate standard semi truck tire. The upper support surface, also called an upper apron, is preferably twelve inches long to provide for positioning of the inner tire on the upper apron in order to facilitate the application of the chain apparatus to the outer tire. The slop of the angle can vary between approximately fifty degrees to seventy degrees, however if the angle is too steep or too shallow it does not facilitate easy positioning of the inner tire upon the ramp.

Preferably, a traction enhancing surface texture is provided on the surfaces of the ramp that are in contact with tires. For example, in the depicted embodiment a metal grating has been applied to each surface on which a tire travels. The metal grating 18 is secured by fasteners 19. Other friction enhancing textured surfaces can be used, including molding friction enhancing texture into molded plastic versions of the ramp, or other friction enhancing texture.

Figure 7:
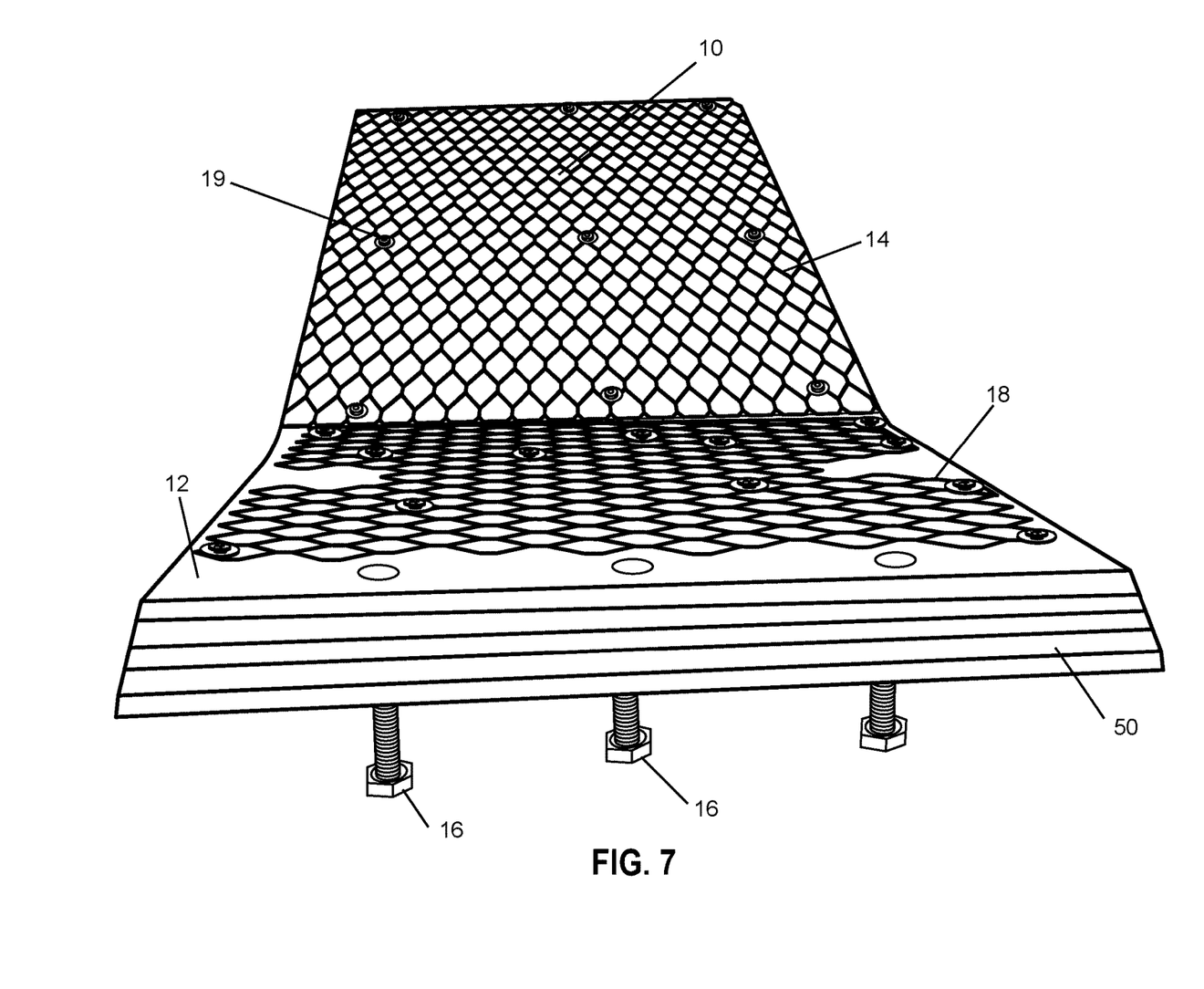
FIG. 7 is a front perspective view of the preferred embodiment of the improved ramp illustrating the front apron, metal grating, and adjustable friction enhancing projections.

FIG. 7 illustrates a front prospective view of the ramp looking at the apron. The front edge 50 of the apron can be constructed with a beveled or sloped edge to facilitate driving of the tire onto the ramp. Preferably this bevel is at 45 degrees, or approximately thereabout. The ramp is positioned in front of or behind the inner tire of the dual tired vehicle. The inner tire is driven on to the ramp and to the suspension platform, thus suspending the outer tire in order for application of the chain. The lower apron is configured to be flat and have a upper surface that is parallel to the ground upon which the device rests.

Figure 8:
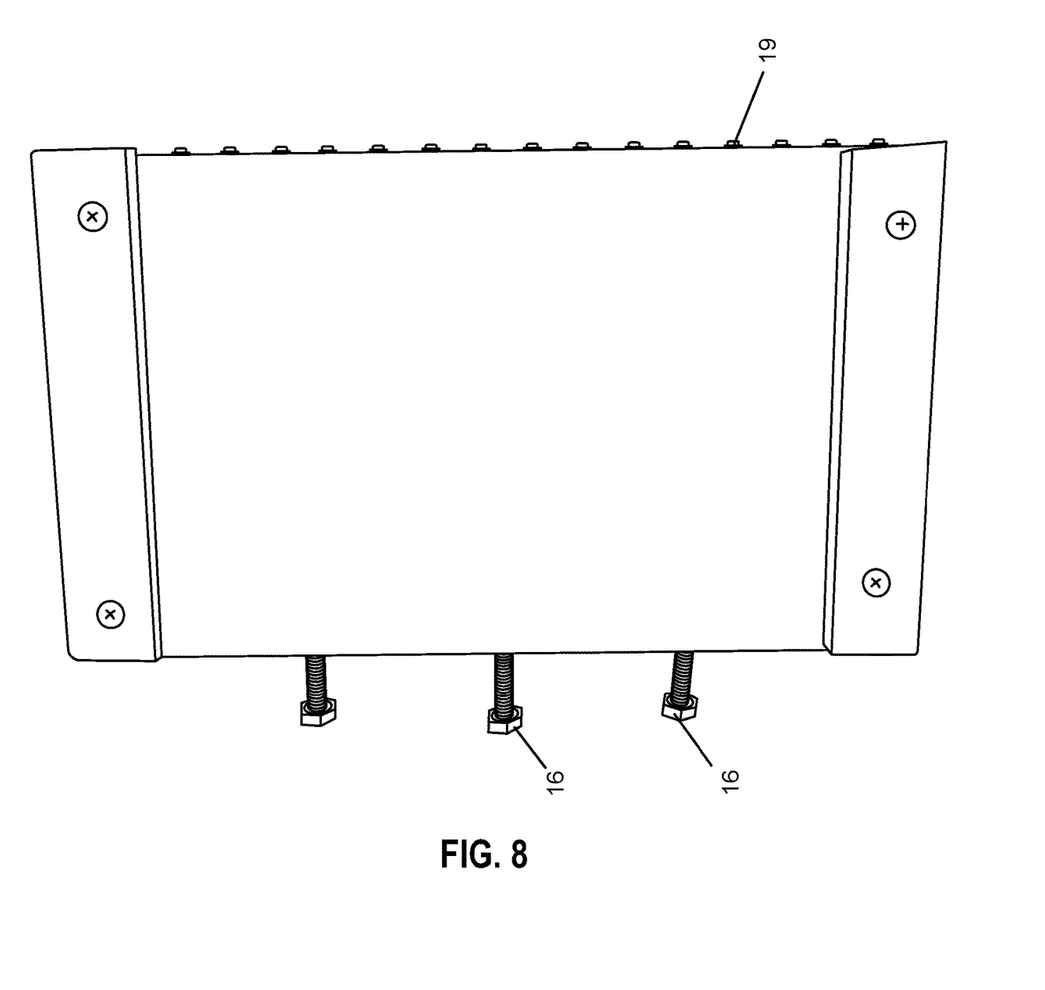
FIG. 8 is a back view of the preferred embodiment of the improved ramp illustrating the metal grating, and adjustable traction enhancing projections.

FIG. 8 illustrates a rear view of the improved ramp. The projection 16 are configured to be height adjustable. In a preferred use, the projections under the apron are shorter than at a rear of the ramp. This allows the apron to be close to or just above the road surface, thus facilitating ease of rolling of the tire onto the apron.

Figure 9:
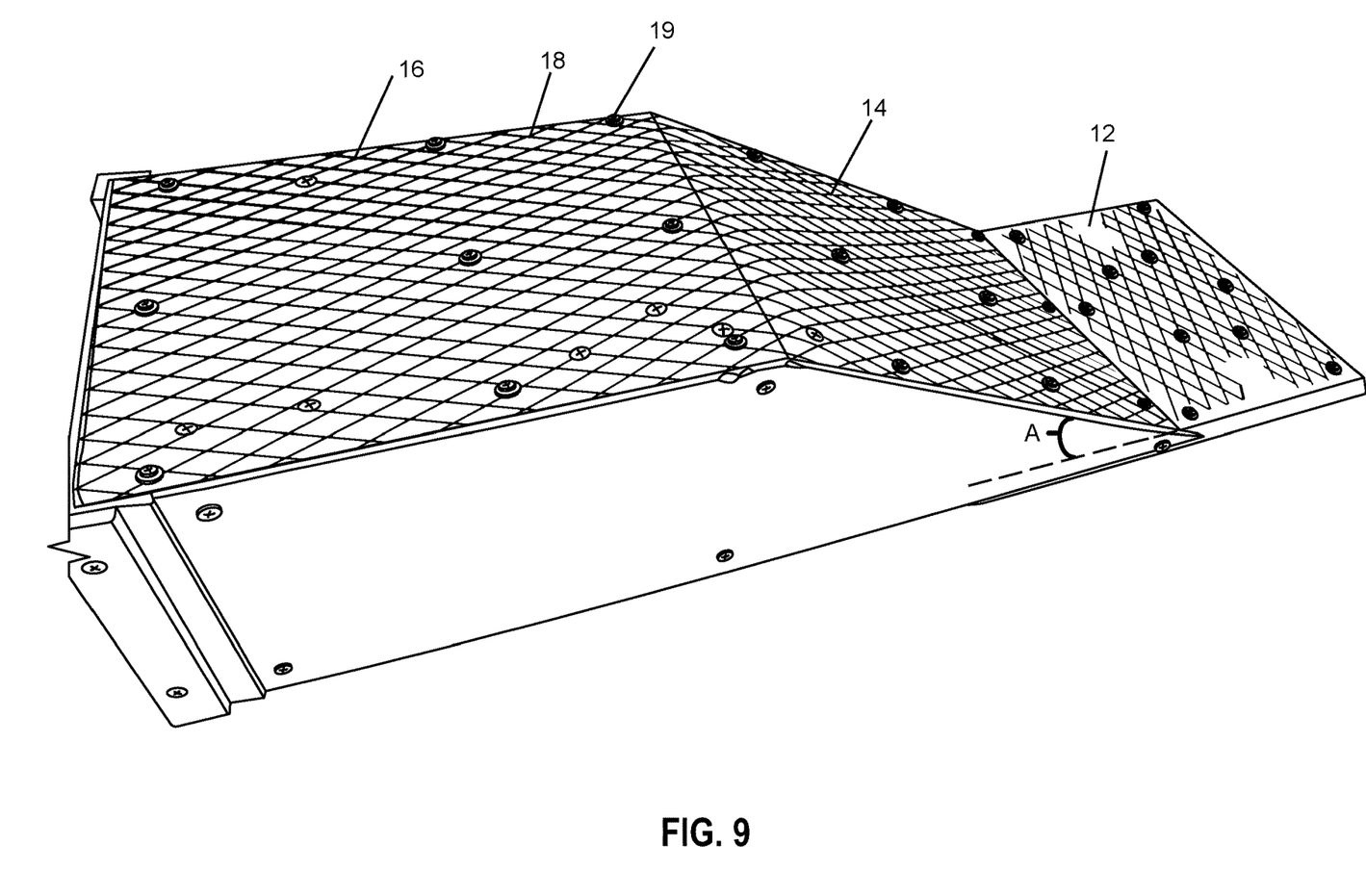
FIG. 9 is a perspective view of the preferred embodiment of the improved ramp.

FIG. 9 illustrates a side prospective view of the improved ramp.

Figure 10:
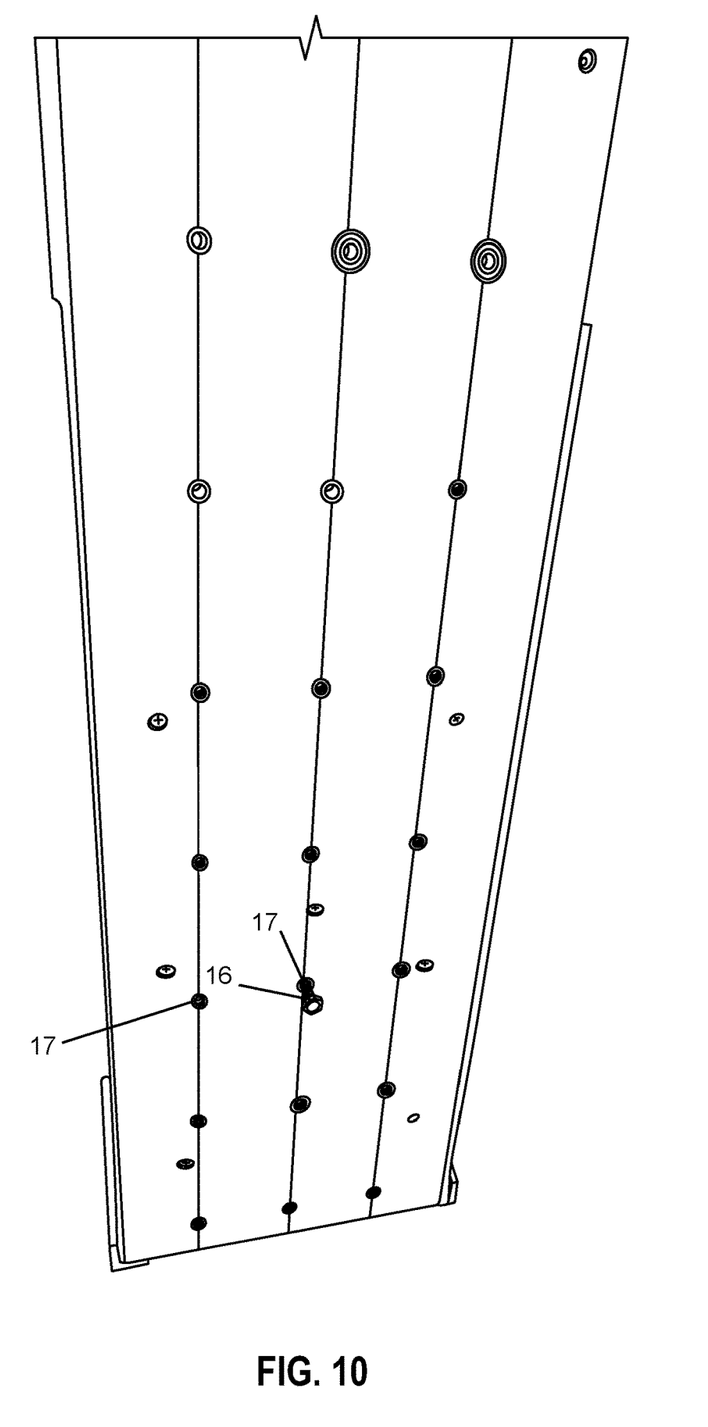
FIG. 10 is a bottom view of the preferred embodiment of the improved ramp illustrating female threaded openings receiving the threaded male adjustable friction enhancing projections.

FIG. 10 illustrates a bottom view of the improved ramp. A series of female threaded openings 17 are positioned through out the bottom surface of the ramp. A threaded hex bolt is shown positioned in one of the openings. This threaded hex bolt 16 can be adjusted into or out of the treaded opening to adjust the length of the traction improving projection. Alternate embodiments of traction improving projections can be utilized, such as straight shanks or other fastener head shapes.

Figure 11:
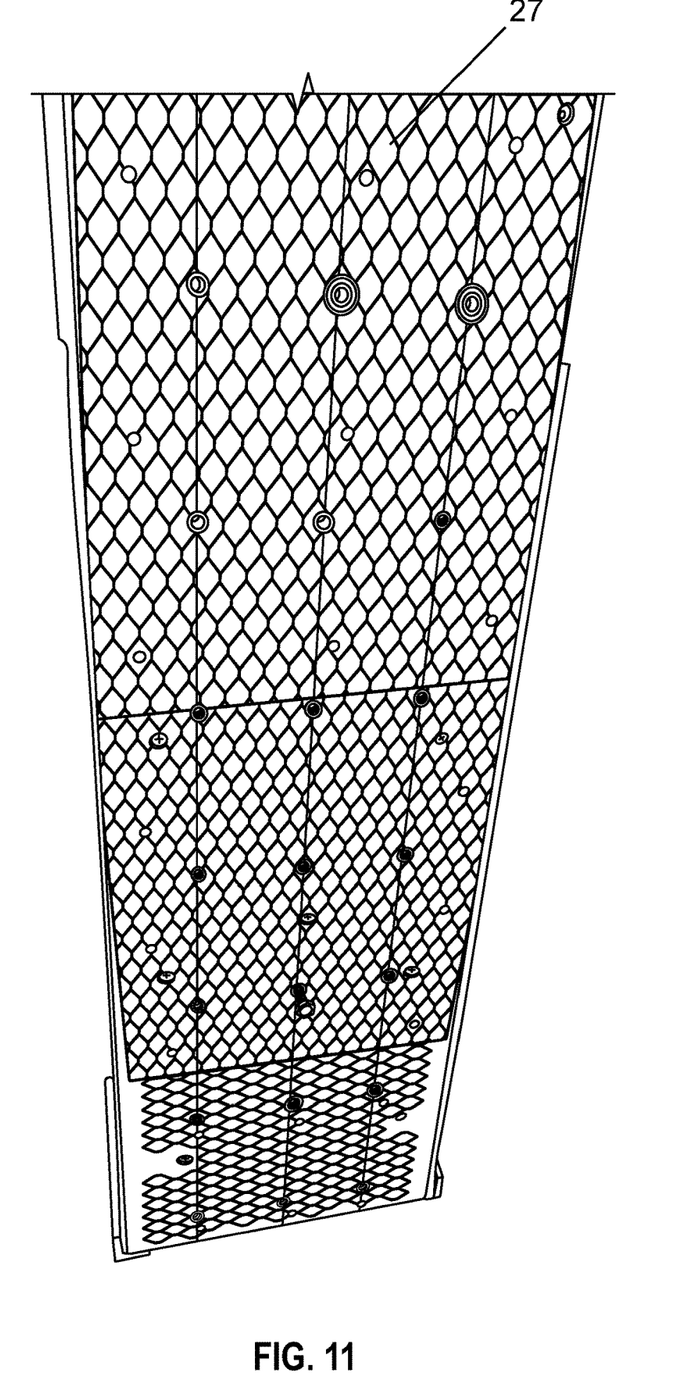
FIG. 11 is a second bottom view of the improved ramp illustrated with a metal grating applied to the bottom surface of the ramp to increase friction between the bottom of the ramp and the surface of a substrate on which the ramp is used.

FIG. 11 illustrates the friction enhancing surface being a metal grating applied to the bottom of the improved ramp device. The grating is preferably affixed by fasteners.

While certain preferred embodiments are shown in the figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

What is claimed is:

1. An improved commercial ramp for use in elevating a tire and wheel combination, said ramp comprising:
   an elongate top platform configured for support thereon of a tire of a vehicle, said elongate top platform positioned on top of a body of said ramp, said elongate top platform having a horizontal surface relative to the ground and positioned on top of said body so as to support a tire above the ground;
   a planar front apron extending from said body and parallel to said elongate top platform, an inclined edge forming a front edge of said body of said ramp, said inclined edge extending from said apron to said elongate top platform;
   a plurality of adjustable friction enhancing projections extending from a bottom side of said ramp, said adjustable friction enhancing projections extending away from said lower surface and configured for adjustability in length each of said adjustable friction enhancing projections extends away from said bottom side of said ramp; and
   wherein said ramp is configured for the tire to drive onto the apron, with the weight of the vehicle applied to the apron providing weight and increased friction between the ramp and a road surface below the ramp to prevent the ramp from being pushed by the tire away from the tire as the tire drives up the sloped ramp to the elongate top platform.

2. The improved commercial ramp of claim 1 wherein said friction enhancing projections comprise threaded bolts.

3. The improved commercial ramp of claim 1 wherein said friction enhancing projections comprise threaded hex bolts.

4. The improved commercial ramp of claim 1 wherein at least one of said apron, said incline edge, and said elongate top platform comprise a friction enhancing textured surface.

5. The improved commercial ramp of claim 4 wherein said friction enhancing textured surface comprises a metal grating.

6. The improved commercial ramp of claim 1 wherein a front edge of said apron is beveled to facilitate a tire rolling onto said apron.

7. The improved commercial ramp of claim 1 wherein said inclined edge is at a fifty to seventy degree incline from a top surface of said apron.

8. A method of using an improved commercial ramp to apply a snow chain assembly to an outer tire of a dual tire configuration, said method comprising: a step of providing the improved commercial ramp for use in elevating a tire and wheel combination, said improved commercial ramp comprising: an elongate top platform configured for support thereon of a tire of a vehicle, said elongate top platform positioned on top of a body of said ramp, said elongate top platform having a horizontal surface relative to the ground and positioned on top of said body so as to support a tire above the ground; a planar front apron extending from said body and parallel to said elongate top platform, an inclined edge forming a front edge of said body of said ramp, said inclined edge extending from said apron to said elongate top platform; a plurality of adjustable friction enhancing projections extending from a bottom side of said ramp, said adjustable friction enhancing projections extending away from said lower surface and configured for adjustability in length each of said adjustable friction enhancing projections extends away from said bottom side of said ramp; and wherein said ramp is configured for the tire to drive onto the apron, with the weight of the vehicle applied to the apron providing weight and increased friction between the ramp and a road surface below the ramp to prevent the ramp from being pushed by the tire away from the tire as the tire drives up a sloped portion of the ramp to the elongate top platform; a step of driving an inner tire of the dual tire configuration onto the apron, and up the inclined edge to the elongate top platform to freely suspend the outer tire of the dual tire configuration; a step of applying the snow chain assembly to the outer tire of the dual tire configuration; and a step of driving the inner tire back down off of the improved commercial ramp.

9. The method of claim 8 wherein said friction enhancing projections comprise threaded bolts.

10. The method of claim 8 wherein said friction enhancing projections comprise threaded hex bolts.

11. The method of claim 8 wherein at least one of said apron, said incline edge, and said elongate top platform comprise a friction enhancing textured surface.

12. The method of claim 8 wherein said friction enhancing textured surface comprises a metal grating.

13. The method of claim 8 wherein a front edge of said apron is beveled to facilitate a tire rolling onto said apron.

14. The method of claim 8 wherein said inclined edge is at a fifty to seventy degree incline from a top surface of said apron.

* * * * *